(12) United States Patent
Pusdesris

(10) Patent No.: US 11,397,680 B2
(45) Date of Patent: Jul. 26, 2022

(54) APPARATUS AND METHOD FOR CONTROLLING EVICTION FROM A STORAGE STRUCTURE

(71) Applicant: Arm Limited, Cambridge (GB)

(72) Inventor: Joseph Michael Pusdesris, Austin, TX (US)

(73) Assignee: Arm Limited, Cambridge (GB)

( * ) Notice: Subject to any disclaimer, the term of this patent is extended or adjusted under 35 U.S.C. 154(b) by 1 day.

(21) Appl. No.: 17/064,019

(22) Filed: Oct. 6, 2020

(65) Prior Publication Data

US 2022/0107894 A1 Apr. 7, 2022

(51) Int. Cl.
| | | |
|---|---|---|
| *G06F 12/08* | (2016.01) | |
| *G06F 12/0808* | (2016.01) | |
| *G06F 12/02* | (2006.01) | |
| *G06F 12/0811* | (2016.01) | |

(52) U.S. Cl.
CPC ...... *G06F 12/0808* (2013.01); *G06F 12/0292* (2013.01); *G06F 12/0811* (2013.01); *G06F 2212/68* (2013.01)

(58) Field of Classification Search
CPC ............. G06F 12/0811; G06F 12/0808; G06F 12/0292; G06F 2212/68
USPC .......................................................... 711/122
See application file for complete search history.

(56) References Cited

U.S. PATENT DOCUMENTS

| | | | | |
|---|---|---|---|---|
| 9,940,239 B1 * | 4/2018 | Drerup | ................ | G06F 12/0864 |
| 2017/0322887 A1 * | 11/2017 | Krashinsky | ......... | G06F 9/30047 |
| 2020/0125498 A1 * | 4/2020 | Betts | .................. | G06F 12/0862 |

* cited by examiner

*Primary Examiner* — Hua J Song
(74) *Attorney, Agent, or Firm* — Nixon & Vanderhye P.C.

(57) ABSTRACT

A technique is provided for controlling eviction from a storage structure. An apparatus has a storage structure with a plurality of entries to store data. The apparatus also has eviction control circuitry configured to maintain eviction control information in accordance with an eviction policy, the eviction policy specifying how the eviction control information is to be updated in response to accesses to the entries of the storage structure. The eviction control circuitry is responsive to a victim selection event to employ the eviction policy to select, with reference to the eviction control information, one of the entries to be a victim entry whose data is to be discarded from the storage structure. The eviction control circuitry is further configured to maintain, for each of one or more groups of entries in the storage structure, an indication of a most-recent entry. The most-recent entry is an entry in that group that was most recently subjected to at least a given type of access. For each group, in response to an access to a given entry of that group other than the most-recent entry for that group, the eviction control circuitry is configured to update the eviction control information according to the eviction policy. However, in response to an access to the most-recent entry for that group, the eviction control circuitry is configured to prevent an update to at least the eviction control information associated with the most-recent entry.

19 Claims, 7 Drawing Sheets

APPARATUS AND METHOD FOR CONTROLLING EVICTION FROM A STORAGE STRUCTURE

BACKGROUND

The present technique relates to data processing. More specifically the present technique relates to controlling eviction from a storage structure.

It is common in data processing systems to provide storage structures to store data. Such storage structures are typically limited in the amount of data that they can store. Consequently, data processing systems may provide an apparatus for controlling which data are stored in the storage structure in an attempt to provide the most relevant data in the storage structure. Selecting which data are to be stored may be done in accordance with an eviction policy (also referred to as a replacement policy) which specifies how to select data to evict from the storage structure in response to a victim selection event.

As an example, for a cache in a cache hierarchy, a cache replacement policy may be used to determine which cache line to select as a victim cache line, for example when space is required to store new data, with the existing content of the victim cache line then being evicted from the cache. Any suitable cache replacement policy can be used, but considering by way of example a least-recently used (LRU) policy, that policy may be employed to keep track of a least-recently used entry in the cache, and select the least-recently used entry for eviction from the cache to make space to store another data item in that entry.

SUMMARY

In one example arrangement, there is provided an apparatus comprising: a storage structure with a plurality of entries to store data; and eviction control circuitry configured to maintain eviction control information in accordance with an eviction policy, the eviction policy specifying how the eviction control information is to be updated in response to accesses to the entries of the storage structure; wherein: the eviction control circuitry is responsive to a victim selection event to employ the eviction policy to select, with reference to the eviction control information, one of the entries to be a victim entry whose data is to be discarded from the storage structure; the eviction control circuitry is further configured to maintain, for each of one or more groups of entries in the storage structure, an indication of a most-recent entry, wherein for each group the most-recent entry is an entry in that group that was most recently subjected to at least a given type of access; and for each group, in response to an access to a given entry of that group other than the most-recent entry for that group, the eviction control circuitry is configured to update the eviction control information according to the eviction policy, and in response to an access to the most-recent entry for that group, the eviction control circuitry is configured to prevent an update to at least the eviction control information associated with the most-recent entry.

In another example arrangement, there is provided a method of managing a storage structure having a plurality of entries for storing data, the method comprising: maintaining eviction control information in accordance with an eviction policy, the eviction policy specifying how the eviction control information is to be updated in response to accesses to the entries of the storage structure; employing the eviction policy to select, responsive to a victim selection event, with reference to the eviction control information, one of the entries to be a victim entry whose data is to be discarded from the storage structure; maintaining, for each of one or more groups of entries in the storage structure, an indication of a most-recent entry, wherein for each group the most-recent entry is an entry in that group that was most recently subjected to at least a given type of access; for each group, in response to an access to a given entry of that group other than the most-recent entry for that group, updating the eviction control information according to the eviction policy; and for each group, in response to an access to the most-recent entry for that group, preventing an update to at least the eviction control information associated with the most-recent entry.

In a still further example arrangement, there is provided an apparatus comprising: a means for storing with a plurality of entries to store data; and a means for controlling eviction configured to maintain eviction control information in accordance with an eviction policy, the eviction policy specifying how the eviction control information is to be updated in response to accesses to the entries of the means for storing; wherein: the means for controlling eviction is responsive to a victim selection event to employ the eviction policy to select, with reference to the eviction control information, one of the entries to be a victim entry whose data is to be discarded from the means for storing; the means for controlling eviction is further configured to maintain, for each of one or more groups of entries in the means for storing, an indication of a most-recent entry, wherein for each group the most-recent entry is an entry in that group that was most recently subjected to at least a given type of access; and for each group, in response to an access to a given entry of that group other than the most-recent entry for that group, the means for controlling eviction is configured to update the eviction control information according to the eviction policy, and in response to an access to the most-recent entry for that group, the means for controlling eviction is configured to prevent an update to at least the eviction control information associated with the most-recent entry.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
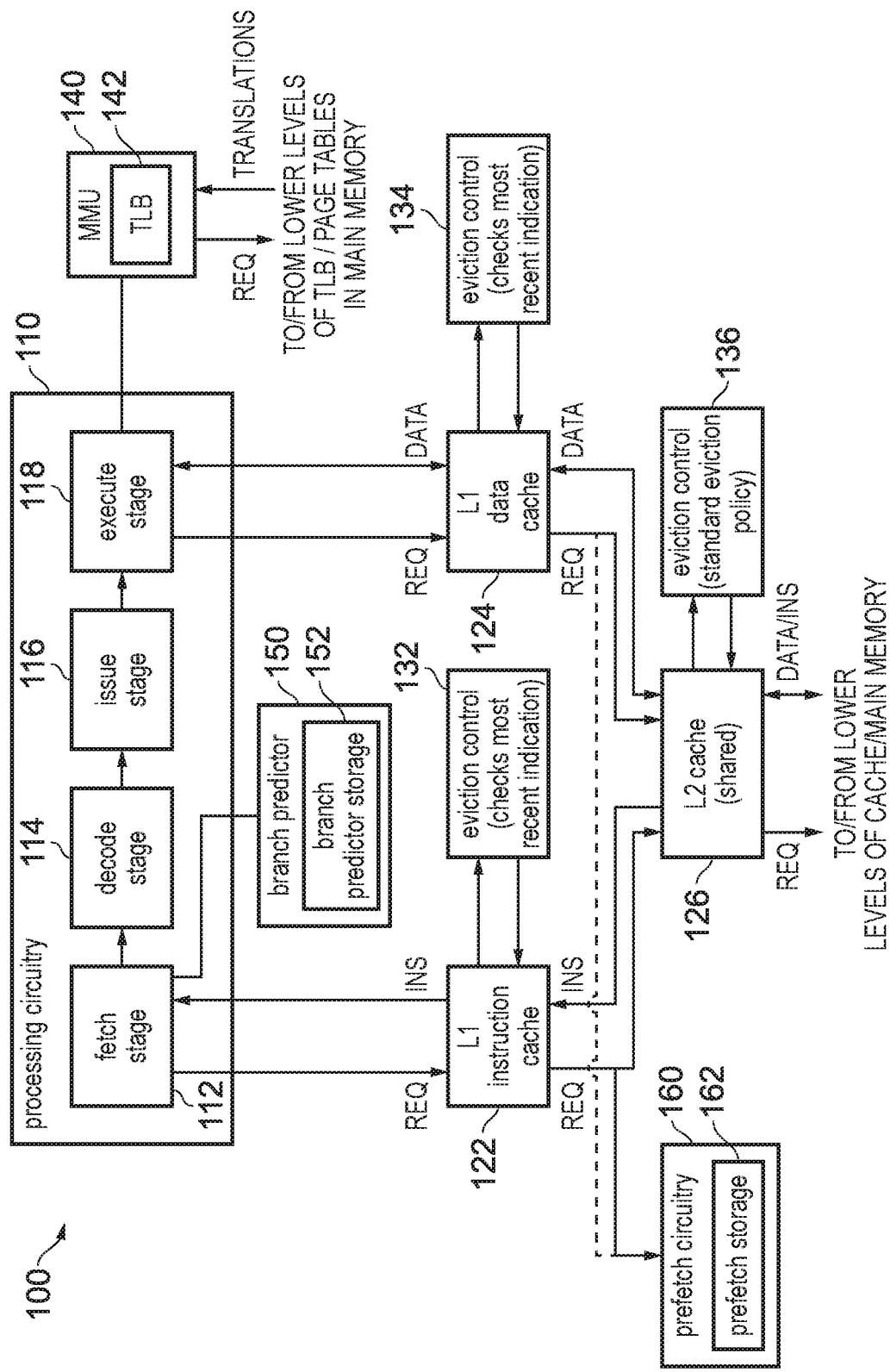
FIG. 1 is a block diagram of a system in which the techniques described herein may be employed.

As mentioned earlier, it may be necessary to select an entry of a storage structure whose data is to be discarded from the storage structure. A victim selection event to initiate such an eviction or discarding from the storage structure may for example be triggered in response to a request to allocate new data in the storage structure in a situation where there is not currently an available entry, or during storage maintenance operations. In response to the victim selection event, eviction control circuitry may be configured to employ an eviction policy to select which entry of the storage structure is to be a victim entry whose data is to be discarded from the storage structure.

The eviction control circuitry may maintain eviction control information and update this information in response to accesses to the entries of the storage structure in a manner defined by the eviction policy. This eviction control information may then be used, again in accordance with the eviction policy, to select a victim entry whose data is to be discarded by the eviction control circuitry in response to the victim selection event. Discarding data from the storage structure could be implemented in a number of ways. For example, discarding the data may involve deleting or overwriting the data stored in the victim entry, or may involve marking the entry as invalid to indicate that the data in the entry is not to be used and can be overwritten.

Often, an eviction policy specifies that the eviction control information is to be maintained in a way that allows a victim entry to be selected based on an assessment of the relative frequencies of access to a given entry. The eviction control information may therefore provide information indicative for each entry of a relative frequency of access. In this way, the eviction policy can ensure that an entry that is infrequently accessed is more likely to be selected for eviction than a frequently accessed entry. Such a policy may be employed where it is deemed that an entry being frequently accessed is suggestive of an entry that is more likely to be accessed again soon. It will be appreciated that other eviction policies operate in a different manner. For example, an eviction policy may specify that the data in a least-recently used entry is to be evicted or even a most-recently used entry is to be evicted.

However, the eviction control information of an eviction policy may be distorted by repeated accesses to the same entry where these repeated accesses should really be considered logically as a single access. If a given entry of a storage structure is repeatedly accessed and the eviction control circuitry is configured to update the eviction control information in response to each access, that entry may appear from the eviction control to have been frequently accessed and so less likely to be evicted. The repeated accesses can therefore lead to over-promotion of an entry and disrupt the operation of the eviction policy. In turn, this may mean than an entry that has been accessed in a cluster of logically related accesses avoids eviction which may reduce the effectiveness of the eviction policy and may thus increase the likelihood that data sought in the storage structure will not be available when it is needed.

One situation in which this problem could arise is where data is initially allocated into an entry and then accessed a number of times, after which the data is no longer needed. For example, if an entire cache line containing a plurality of data items is allocated into a cache and then several of the data items in the cache line are accessed, this may lead to over-promotion of the cache line where each access to a data item is treated as an independent access to the cache line. That cache line could therefore end up being designated as a frequently accessed cache line and so escape eviction. In accordance with the techniques described herein the eviction control circuitry is arranged in a manner that can prevent the eviction control information for such an entry from being updated to indicate that the entry been has repeatedly accessed in such a situation.

In some example implementations, the eviction control circuitry is configured to maintain, for each of one or more groups of entries in the storage structure, an indication of a most-recent entry. This indication of a most-recent entry identifies an entry in the group that was most recently subjected to a given type of access. By maintaining this indication for each group of entries, the eviction control circuitry is able to identify which entry in the group has been most-recently subjected to the at least a given type of access.

This at least a given type of access may be a single type of access such as a fill access with the indication of a most-recent entry identifying which entry in the group most recently had data allocated to it. However, it will be appreciated that the at least a given type of access may comprise one or more other types of access. For example, the at least a given type of access could comprise all types of access supported by the storage structure, with the indication of a most-recent entry indicative of a most-recently accessed entry in the group of entries.

In some example implementations, the eviction control circuitry may be configured, for each group, to only update the eviction control information according to the eviction policy in response to an access to a given entry other than the most-recent entry for that group. That is, for entries in the group other than the most-recent entry, when an access to an entry occurs, the eviction control circuitry updates the eviction control information as specified by the eviction policy to indicate that that access has occurred. However, in response to an access to the most-recent entry for that group, the eviction control circuitry is configured to prevent an update to at least the eviction control information associated with the most-recent entry.

The effect of this approach can be seen for example where a particular entry in the group is subject to at least the given type of access followed by a series of successive accesses. In response to the first access, if not already indicated as the most-recent entry, the eviction control circuitry will update the eviction control information to indicate that the access to the particular entry has taken place and update the indication of a most-recent entry to identify the particular entry. In response to the following accesses, however, since the particular entry is identified as the most-recent entry for the group, the eviction control circuitry will suppress the update to the eviction control information. Hence, the eviction control information will be updated in response to only the first of these accesses and so the entry will not be over-promoted in the eviction control information.

By preventing an update to at least the eviction control information associated with the most-recent entry in this manner, over-promotion of entries subject to sequential accesses, such as where data is allocated, then accessed several times in order to implement what is logically a single access (for example by performing a series of write operations to update the data in that entry when that cannot be performed via a single access, for instance due to bandwidth constraints), and is not then accessed again, can be mitigated. This means that the eviction control information as updated in accordance with the eviction policy provides a better indication of the likelihood of an entry being accessed again. Accordingly, the eviction control circuitry is more likely to keep data that will be needed again in the storage structure, leading to fewer misses in the storage structure.

It will be appreciated that the eviction control information can take a number of forms. For example, an eviction influencing value may be provided for each entry in the storage structure with that eviction influencing value being updated in response to an access to the relevant entry and referenced to determine whether data in that entry should be discarded. In such a case, the eviction control information associated with the most-recent entry may comprise the eviction influencing value of the most-recent entry. Alternatively or additionally, other structures of eviction control information may be used. For example, a tree structure (such as a binary tree structure used in the tree-pseudo-LRU eviction policy) may be maintained to store at each node eviction control information associated with a portion of the storage structure. In this case, the eviction control information associated with the most-recent entry may comprise values stored at nodes associated with the most-recent entry even though one or more of these nodes may also be associated with other entries.

In response to an access to the most-recent entry for a group, even though the eviction control circuitry is configured to prevent an update to at least the eviction control information associated with the most-recent entry, eviction control information not associated with the most-recent entry may still be updated. For example where the eviction policy defines an 'ageing' process whereby an age value is incremented for entries in a group other than the entry subject to an access, this ageing process may still occur for the entries other than the most-recent entry.

The techniques described herein may be particularly beneficial where the eviction policy specifies that the eviction control information is to distinguish between a used-many state for entries storing data subject to one or more accesses following an initial access and a used-once state for entries not subject to an access following an initial access. These states may also be referred to as a placement state and a promotion state, an insertion state and a hit state, or any combination of these terms. By preventing the update to the eviction control information in response to an access to the most-recent entry, the eviction control circuitry may prevent an update from the used-once state to the used-many state.

The distinction may be made in the eviction policy between the used-once state and the used-many state on the understanding that some data are accessed only once and then not needed again whereas other data may be accessed on a frequent basis. As such, entries being accessed more than once is strongly suggestive that those entries may be accessed again, whereas data accessed only once are frequently not required again. Accordingly, it may be desirable to distinguish between entries storing these data using the eviction policy so that data that has only been accessed once is more likely to be evicted than data that has been accessed many times, even if the data accessed many times has not been accessed as recently as the data accessed only once.

However, in some systems, it may be common for data to be allocated to an entry in the storage structure, that entry accessed a number of times sequentially, and then not accessed again (at least for a relatively long period of time). In accordance with the techniques described herein, it is possible to designate such entries as used-once even though they have been subject to multiple accesses. In particular, by suppressing the update to the eviction control information associated with the most-recent entry, such sequential accesses can be handled logically as a single access, and so promotion of the entry to the used-many state can be prevented. This may lead to a more effective eviction policy, increasing the likelihood that requested data will be present in the storage structure.

In some example implementations, each entry in the storage structure is arranged to store a plurality of data items that can be accessed independently. This arrangement may make it particularly likely that sequential accesses occur to an entry in the storage structure that should logically be regarded as a single access for the purposes of updating the eviction control information. This is because several data items in the plurality of data items may be accessed sequentially in order to access a desired range of data items (for example where it is not possible to access the desired range of data items via a single access). Although these accesses to different data items can logically be viewed as a single access to the data content of the entry, they may appear as a plurality of accesses to the same entry. In this case, multiple sequential accesses to the individual data items of the entry may be prevented from causing the eviction control information associated with the most-recent entry to be changed from the used-once state to the used-many state.

According to some example implementations, the eviction control information comprises an eviction influencing value for each entry in the storage structure. This eviction influencing value may be maintained in accordance with the eviction policy to distinguish between a used-many state and a used-once state for each entry in the storage structure. Specifically, the eviction influencing value for an entry may be initialised to a first value on allocation of data into that entry, and the eviction influencing value then modified from the first value on occurrence of a subsequent access to the entry unless prevented due to that entry being identified as the most-recent entry. This approach allows entries that have been subject to only an allocation of data to be handled differently to entries that contain data that has been accessed since being allocated. This therefore provides an efficient way to implement an eviction policy that recognises that some data may be accessed only once and not needed again whereas other data may be accessed on a frequent basis, whilst ensuring that sequential accesses to the same entry do not over-promote the eviction influencing value for the entry.

According to a re-reference interval prediction policy (RRIP), which is an example of an eviction policy, the eviction control information comprises a prediction value for each entry in the storage structure, indicative of a predicted re-reference interval for that entry. Upon allocation of data into a particular entry of a given group, RRIP specifies that the prediction value for the particular entry be set to an initial value. According to an example implementation, the RRIP is a dynamic re-reference interval prediction policy (DRRIP) which selectively switches between a static re-reference interval prediction policy (SRRIP) for which the initial value is 2 and a bi-modal re-reference interval prediction policy (BRRIP) for which the initial value is randomly selected as either 2 or 3. A low prediction value is indicative of an entry that is predicted as most likely to be accessed soon and a high prediction value is indicative of an entry that is unlikely to be accessed soon. In response to allocation of data into the particular entry, the prediction value for each of the other entries in the given group is incremented by 1. In response to a victim selection event, the entry (or one of the entries) with the highest prediction value is selected as the victim entry. In response to an access other than an allocation to an entry, the prediction value for that entry is set to 0. However, according to the example implementation, the update to set the entry to 0 is prevented if the access is to the most-recent entry. This means that the prediction value for the most-recent entry is not set to 0 in response to an access to the most-recent entry, thereby avoiding over-promoting the entry when an entry is subject to a series of successive accesses.

The storage structure may support a number of different types of access. In some example implementations, the storage structure supports a fill access whereby in response to an attempt to access data that is not stored in the storage structure, the storage structure accesses the data from another storage structure, provides access to the data, and allocates the data to an entry in the storage structure. Other types of supported access may include accesses to data already residing in an entry, and those accesses may themselves be of different types, for example read accesses or write accesses. Accesses may also be performed in order to implement storage maintenance operations, or to perform functions such as selecting a victim entry.

In some example implementations, the given type of access in response to which the most-recent entry is updated is a fill access that causes an identified entry of the storage structure to be filled with data. The eviction control circuitry may therefore be configured to update, on each occurrence of the fill access to an entry of a particular group, the indication of the most-recent entry for the particular group to indicate the identified entry that was filled with data in response to the fill access. In this way, the indication of the most-recent entry can identify the most-recently filled entry. Therefore, when an entry of a particular group is accessed following a fill access that allocated data to that entry, the indication of the most-recent entry will match the entry being accessed and so the eviction control circuitry will prevent an update to the eviction control information associated with that entry. This means that where an access request is made for data that is not in the storage structure followed by repeated accesses to that entry (for example to read or write to the various data items in that entry), the eviction control information will not be updated to reflect the repeated accesses following the allocation. This prevents over-promotion of the entry where data is accessed repeatedly for a short period following the allocation, and then not used again.

According to some example implementations, the storage structure comprises a single group with all of the entries in the storage structure. The most-recent entry is therefore the entry in the entire storage structure most-recently subjected to at least the given type of access. This approach means that only one indication of a most-recent entry needs to be provided for the entire storage structure, reducing the amount of overhead in storage capacity needed to keep track of the indications of the most-recent entries whilst still allowing a series of successive accesses to the most-recent entry to be identified by the eviction control circuitry and an update of the eviction control information for that entry suppressed.

In some example implementations, however, each group is associated with a sub-structure of the storage structure. The storage structure therefore comprises a plurality of groups with an indication of most-recent entry maintained by the eviction control circuitry for each group. This approach therefore means that the indication of a most-recent entry for a particular group will persist even if intervening accesses are made to entries in one or more other groups. Hence, by associating each group with a sub-structure of the storage structures even if the successive accesses to a given entry in the particular group are interrupted by accesses to a different group, the eviction control circuitry will still prevent the update to the eviction control information associated with the most-recent entry for the particular group. This approach may also be easier to implement where a storage structure is already provided with sub-structures, as the indications of a most-recent entry for each group may, for example, be provided in combination with eviction control information already stored on a per-sub-structure basis.

In some example implementations, the storage structure is a set associative storage structure and each sub-structure is a set of the set associative storage structure. This means that each item of data may be placed in any of a set of entries associated with the item of data. For example, where the data is identified by a memory address, a portion of the memory address may be used to identify a set within the storage structure within which the data item must be allocated, but the item of data can be allocated to any of the entries (referred to as ways) of the set. Purely by way of example, the storage structure may be a 4-way set associative storage for which each set contains four ways providing four possible entries in which an item of data could be stored. It will be appreciated that other caches may have a greater or smaller associativity. A set associative storage structure provides a balance between a fully-associative approach and a direct-mapped approach allowing for easier identification of where an item of data is stored than a fully-associative storage structure whilst providing more flexibility as to which entries can be used to store any a particular item of data than a direct-mapped storage structure. For the set associative storage structure, the indication of a most-recent entry may be maintained by the eviction control circuitry for each set of the set associative storage structure to provide an indication of a most-recent way of the set most recently subjected to at least the given type of access.

The techniques described herein may be particularly beneficial when applied to a cache. In such example implementations, the storage structure may be a cache and each of the plurality of entries of the cache may comprise a cache line. A cache line may cache a plurality of individually addressable items. The caches in a cache hierarchy may be configured to pass entire cache lines between the caches whereas if coupled directly to processing circuitry, a cache may be configured to provide access to the individual data items of the cache line. However, the cache may be configured to load an entire cache line into the cache during an allocation event in response to a request to access a single data item which was not already in the cache (this loading of an entire cache line being the earlier-mentioned fill access). Where an indication of a most-recent entry is not stored and an update to the eviction control information not prevented, a large number of successive accesses to an entry of the storage structure that may logically be regarded as a single access may then occur. Since each entry comprises a cache line comprising a plurality of individually addressable items, it may be fairly common for the individual items of the cache line to be accessed in turn so as to access data corresponding to a range of memory addresses. Although the data accessed relates to different memory addresses and different data items are accessed, these accesses may appear as successive accesses to the same cache line. However, it may be considered that unlike where frequent access to an entry would otherwise be indicative of an entry that is likely to be accessed again soon, accesses to different data items of the same cache line following an allocation of that data into the cache may not be suggestive of a cache line that is likely to be accessed again soon. Hence, by maintaining an indication of a most-recently allocated cache line in a group of cache lines (e.g., a way of a set associative cache) and preventing an update to the eviction control information associated with the cache line when the most-recently allocated cache line is then repeatedly accessed, over-promotion of the cache line can be mitigated. This can help to make the eviction policy more effective in discarding only the cache lines least likely to be used again soon and consequently reduce the incidence of cache misses which lead to lower levels (further away from the processor) of a cache hierarchy needing to be referenced. Therefore, the average latency of an access to the storage structure may be reduced.

Although the techniques described herein may be applied to a cache at any level of a cache hierarchy, in some example implementations, the techniques may advantageously be applied to a level 1 (L1) cache. As described above, where individually addressable data items of a cache line are accessed in turn, this can appear as repeated accesses to the cache line and can lead to over-promotion of the cache line even though these accesses may logically be considered as a single access to the whole cache line. This effect may be particularly severe in the context of an L1 cache responsive to accesses directly from processing circuitry as compared to lower levels of cache further away from processing circuitry. This is because the L1 cache may act to filter the accesses 'seen' by the level 2 (L2) cache and lower level caches. Because the L1 cache will typically only access the L2 cache when the L1 cache does not store the requested data, if data is requested repeatedly by the processing circuitry, although the L2 cache may see one access from the L1 cache if the L1 cache did not store the data initially, any further accesses by the processing circuitry will be serviced by the L1 cache without reference to the L2 cache on account of that data already being cached in the L1 cache.

As an example to illustrate this point, a situation where the processing circuitry accesses each data item of a cache line in turn will be considered. In response to the first access, the L1 cache may or may not already store the cache line containing the requested data item. If the L1 cache did not already store the data item, the L1 cache would request the entire cache line containing the requested data item from the L2 cache and the L2 cache would 'see' one access to the cache line. As well as providing access to the requested data item, the L1 cache would cache the entire cache line containing that data item. In response to the subsequent accesses from the processing circuitry requesting the other data items in the cache line, the L1 cache would already cache the cache line containing these data items and so could provide access to these data items without referencing the L2 cache. Hence, the L2 cache would see at most one access to the cache line whereas the L1 cache would see a plurality of successive accesses to the same cache line in this scenario. Therefore, it can be particularly beneficial in the L1 cache to prevent an update to the eviction control information for the cache line in response to the accesses following the initial access in this example, thereby avoiding over-promotion of the cache line and improving the effectiveness of the eviction policy.

As mentioned above, the storage structure may be a cache. For example, the storage structure may be a cache to store data for access by processing circuitry. This data may comprise data to be operated on by processing circuitry, instructions to be executed by the processing circuitry, or both. Another example of a storage structure to which the techniques described herein may be applied is a translation lookaside buffer (TLB) to store address translation data used to convert a virtual address specified by the processing circuitry into a physical address used to identify a location in memory. Alternatively or additionally, the storage structure may be a storage structure of a branch predictor used to maintain branch prediction information. For example, the storage structure could be a branch target buffer (BTB) to store information about predicted target addresses for branches. Another storage structure in which the present techniques could be employed is a storage structure for a prefetcher, with the storage structure referenced by the prefetcher to determine data to be prefetched into a cache. Prefetch circuitry will typically comprise a buffer to aid in identifying patterns of accesses so that based on the actual demanded accesses being issued by the processor, the prefetch circuitry can predict which items of data the processor is likely to seek access to next, and hence prefetch those data into a cache. One or more storage structures provided in the prefetch circuitry to keep track of patterns of accesses may make use of the techniques described herein to ensure that the data relating to the most relevant patterns of accesses are not discarded from the storage structure. It will be appreciated that the techniques described herein are not limited to these particular storage structures and may be applied to any suitable storage structure.

The storage structure may be arranged within a hierarchy of storage structures such as a cache within a hierarchy of caches accessed by processing circuitry. As another example, the storage structure may be a micro-translation lookaside buffer (uTLB) caching address translation information for a TLB, the TLB itself caching address translation information from page tables stored in memory. By preventing an update to the eviction control information in response to an access to the most-recent entry, the eviction policy can operate more effectively to ensure that data that is more likely to be needed in the storage structure is not discarded by virtue of having other entries over-promoted. This therefore reduces the number of misses in the storage structure where requested data is not allocated in the storage structure, thereby reducing the number of times that the storage structure has to reference a storage structure at a lower level in the hierarchy. Referencing a lower level in the hierarchy can be a costly operation in terms of the amount of time taken, particularly if several levels of the hierarchy have to be accessed and/or the data needs to be accessed from main memory. Therefore, by reducing the incidence of cache misses, page table walks and similar operations, the latency of accesses to the storage structure can be reduced.

The victim selection event could be triggered in a number of ways. For example, the victim selection event could be triggered when the storage structure does not have capacity to allocate a new item of data into the storage structure. This could occur when the entire storage structure is full or when a sub-structure into which the new item should be allocated is at capacity. Thus, the victim selection event may be used to make space in the storage structure for allocating data in response to a request to access data not already stored in the storage structure. Additionally, or alternatively, the victim selection event may be triggered by a maintenance operation such as a cache maintenance operation. Sometimes it is necessary to perform maintenance on a storage structure such as a cache for example to ensure coherency between related storage structures. This may involve selecting entries for eviction from the storage structure and so the victim selection event may be triggered to invoke such a selection.

Particular examples will now be described with reference to the figures.

FIG. 1 is a block diagram of a system 100 in which the techniques described herein may be employed. FIG. 1 depicts processing circuitry 110 provided for executing instructions. The processing circuitry 110 is coupled to main memory via a cache hierarchy consisting of multiple levels of cache 122, 124, 126. In this example, a separate L1 instruction cache 122 and L1 data cache 124 are provided, both coupled to a shared L2 cache 126. The processing circuitry 110 may issue requests specifying an address of content that is required by the processing circuitry 110. The content may comprise instructions to be executed by the processing circuitry 110 and/or data values to be manipulated by the processing circuitry 110 when executing those instructions. The processing circuitry 110 has a fetch stage 112 that seeks to fetch from memory instructions that will be required to be executed by the processing circuitry 110. The fetch stage 112 has access to branch prediction circuitry in the form of branch predictor 150 to predict the instruction flow through a computer program, and hence predict which instructions should be fetched next. The branch predictor 150 makes use of branch prediction storage 152 to store data used in predicting branch information such as whether branches will be taken/not taken and the target addresses of those branches. The fetch stage 112 will typically fetch blocks of instructions at a time, with reference to an address output in a fetch request, and those fetch requests will be issued to the L1 instruction cache 122.

When a request specifying an instruction address is issued from the processing circuitry 110, a lookup operation is performed within the L1 instruction cache 122 to determine whether that address matches an address of a cache line of instructions stored within the L1 instruction cache 122, and if so a cache line's worth of instructions can be returned to the processing circuitry 110. Eviction control circuitry 132 is provided to apply an eviction policy in order to maintain eviction control information and determine, using the eviction control information, victim cache lines whose contents can be evicted from the cache in order to make space for new content to be stored therein. In particular, when a cache line of instructions is retrieved from a lower level of cache, it may be allocated into the L1 instruction cache 122, and at that point it will typically be the case that a victim cache line needs to be selected whose contents are going to be discarded, whereafter the newly retrieved instructions can be stored into that entry as a newly allocated cache line. Any suitable eviction policy may be applied by the eviction control circuitry 132, but in one example arrangement it will be assumed that a re-reference interval prediction (RRIP) policy is used.

In the event of a miss within the L1 instruction cache 122, then the L1 instruction cache 122 can propagate the request onto the shared L2 cache 126, causing a lookup operation to be performed within the L2 cache 126 to determine whether the required instructions are present therein. If so, then the instructions identified by the request address can be returned to the L1 instruction cache 122 for onward propagation back to the processing circuitry 110. Those retrieved instructions from the L2 cache 126 will typically be allocated into a cache line in the L1 cache 122, in addition to being propagated back to the processing circuitry 110.

Similarly, if a hit is not detected within the L2 cache 126 based on the request, then the request can be propagated on to any other additional levels of cache in the cache hierarchy, and in the absence of a hit being detected in any such levels of cache, then the request can be propagated on to main memory in order to retrieve from main memory the instructions requested. The instructions can then be propagated back through the cache hierarchy for provision to the processing circuitry 110.

As shown in FIG. 1, each of the caches 122, 124, 126 will have associated eviction control circuitry 132, 134, 136 for controlling the associated cache. The eviction control circuitry may form part of general control circuitry used to control accesses to the associated cache, and to perform other functions such as cache maintenance operations and the like. The eviction control circuitry is responsible for selecting victim cache lines whose contents are going to be discarded to make way for newly allocated cache contents. In the example illustrated in FIG. 1, it is assumed that the eviction control circuitry provided in association with each of the caches applies, as its eviction policy, a RRIP policy.

Although the operation of the L1 instruction cache 122 operating in response to a request for instruction from the fetch stage 112 has been discussed in detail, it will be appreciated that similar techniques may be applied by the L1 data cache 124 and its eviction control circuitry 134 operating in response to requests for data from an execute stage 118 of the processing circuitry 110.

Although eviction control circuitry 132, 134, 136 for the caches 122, 124, 126 could maintain an indication of a most-recent entry as described in detail below, it assumed that in the example implementation depicted in FIG. 1, only the L1 caches 122, 124 check a most-recent indication in response to a victim selection event whereas the L2 cache employs the RRIP policy (or any other suitable eviction policy) without referencing a most-recent indication.

Prefetch circuitry 160 is provided in association with the L2 cache 126 to analyse the requests received by that cache, and apply prediction mechanisms to seek to predict which content will be requested at some point in the future. For example, various pattern analysis techniques may be used to seek to identify patterns in the addresses associated with a series of requests received by the associated cache, and to then use those patterns in order to seek to predict future addresses that will be requested. The prefetch circuitry 160 makes use of prefetch storage 162 to store data representative of the observed patterns in the addresses associated with a series of requests and is referenced to predict the addresses of content that will be requested. The prefetch circuitry 160 may perform prefetching activity for instructions, for data, or for both.

If desired, prefetch circuitry can also be provided in association with one or more other levels of cache, and hence for example prefetch circuitry may be provided in association with the L1 instruction cache 122 or the level 1 data cache 124. In that event, the prefetch circuitry associated with each cache can monitor the demand access requests received by its associated cache in order to seek to predict the future demand accesses, and to then seek to prefetch content into the associated cache before such demand accesses are issued, thereby increasing hit rate with the associated cache. Further, if desired, the prefetch circuitry 160 in such an implementation could monitor not only the demand requests issued by the L1 instruction cache 122 relating to instructions that have actually been requested by the fetch stage 112, but can also monitor the prefetch requests issued as a result of the activities of the prefetch circuitry provided in association with the L1 cache 122, identifying instructions that are anticipated to be requested in due course by the fetch stage 112. Based on both of those activities, the prefetch circuitry 160 can then determine which instructions to prefetch into the L2 cache 126. A similar technique could also be employed with regard to data prefetching into the L2 cache.

Instructions that are fetched by the fetch stage 112 are then passed to a decode stage 114 where they are decoded in order to produce decoded instructions (sometimes also referred to as macro operations) which are then stored within the issue stage 116. Once the source operands are available for those decoded instructions, then those decoded instructions can be passed to the execute stage 118 for execution. When executing instructions, the source operand values required may be retrieved from a register bank, and the results produced by execution of those instructions can be stored back into specified registers of the register bank. Load and store instructions can be executed in order to load data values from memory into the register bank, or to store data values from the register bank back into the memory system.

As shown in FIG. 1, when executing load or store instructions, the execution stage will interface with L1 data cache 124, and from there to one or more lower levels of cache/main memory.

In the example shown in FIG. 1, it is assumed that at the level 1 cache level of the hierarchy, there is a separate L1 instruction cache 122 and a separate L1 data cache 124. Whilst separate caches could also be used at one or more other levels, in one example arrangement all of the other levels of cache, including the L2 cache 126, may be unified caches that store both instructions and data.

The processing circuitry 110 may be arranged to refer to memory locations using virtual addresses with these virtual addresses different from the physical addresses used to refer to actual locations in main memory. Accordingly, the system 100 may be provided with a memory management unit (MMU) 140 to perform address translation from virtual addresses specified by the execute stage 118 of the processing circuitry 110 to physical addresses which can be provided to the L1 data cache 124 in a request to access data. Page tables storing the translation data for converting between virtual and physical addresses are stored in main memory. However, to avoid having to reference main memory and perform a time-consuming page table walk to identify the correct item of address translation data each time a translation needs to be performed, the MMU 140 is arranged to reference a translation lookaside buffer (TLB) 142 which caches a subset of the address translation data. Although not shown in FIG. 1, an MMU and associated TLB structure may also be provided in association with the instruction fetch path to translate virtual addresses issued by the fetch stage into physical addresses.

The storage structures 142, 152, 162 of the MMU 140, branch predictor 150, and prefetch circuitry 160, respectively, may be provided with their own eviction control circuitry to maintain eviction control information and determine victim entries to be selected for eviction from the storage structure. In addition to, or instead of, the eviction control circuitry associated with the cache structures described herein, such eviction control circuitry may be configured to reference a most-recent indication when maintaining eviction control information in accordance with the techniques described herein.

Figure 2:
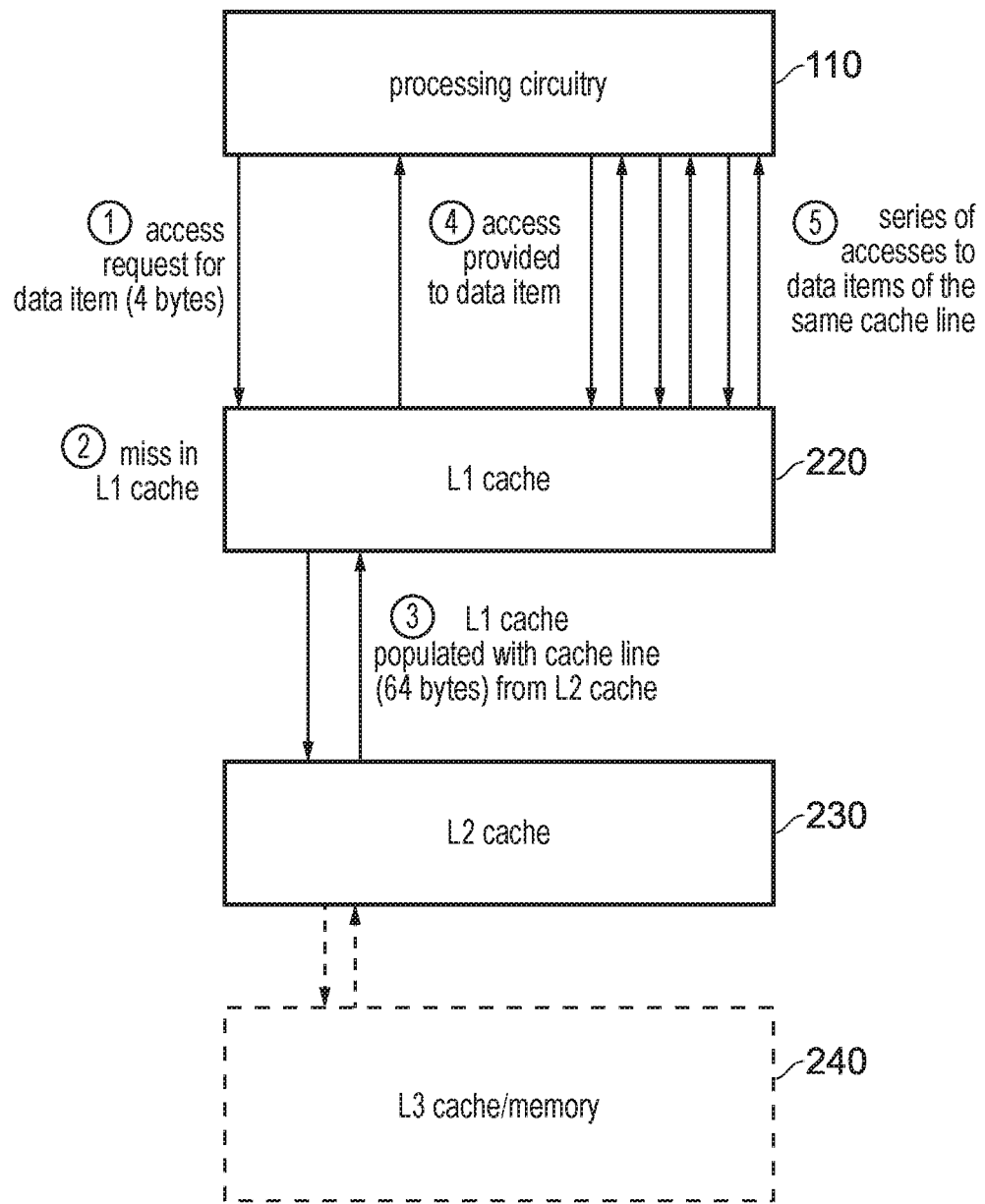
FIG. 2 is a block diagram illustrating a pattern of accesses that may cause over-promotion of a cache line within a level 1 (L1) cache, and the filtering of requests to a level 2 (L2) cache provided by the L1 cache.

FIG. 2 is a block diagram illustrating a pattern of accesses that may cause over-promotion of a cache line in an L1 cache 220, and the filtering of requests to an L2 cache 230 provided by the L1 cache. FIG. 2 depicts processing circuitry 110 coupled to a cache hierarchy comprising an L1 cache 220, L2 cache 230, any further levels of cache, and main memory 240. In this example implementation, both the L1 cache 220 and L2 cache 230 are shared caches caching both data and instructions although it will be appreciated that separate caches at one or more levels of the cache hierarchy could be provided.

The processing circuitry 110 may issue requests specifying an address of a data item (which may comprise data or instructions) that is required by the processing circuitry. As will be apparent from the earlier discussion of FIG. 1, the request can propagate through the cache hierarchy until a cache line containing the data item is found, at which point the data item can be returned through the cache hierarchy to the processing circuitry 110, and that cache line can also be allocated into one or more levels of the cache hierarchy.

As per the earlier discussion of FIG. 1, the eviction control circuitry associated with each of the caches will employ an eviction policy to determine cache lines whose contents can be evicted from the cache in order to make space for new content to be stored therein, or to perform a cache maintenance operation (e.g., to ensure coherency). Any suitable eviction policy may be applied by the eviction control circuitry, but in one example implementation, it will be assumed that a RRIP policy is used which provides eviction control information in the form of a prediction value for each entry in the cache indicative of a predicted relative likelihood that the entry will be referenced again soon.

FIG. 2 illustrates an example of how requests from the processing circuitry 110 to access a series of data items can lead to over-promotion of a cache line, particularly in the L1 cache 220.

At step 1, the processing circuitry 110 issues a request specifying a specific data item to which access is sought. The access request is first received by the L1 cache 220. The L1 cache 220 performs a lookup operation to determine whether the specified address matches an address of a cache line stored within the L1 cache 220. In this example, the L1 cache 220 does not already store the cache line containing the specified data item and so a cache miss occurs at step 2.

Consequently, the L1 cache 220 issues a request to the L2 cache 230 for the cache line containing the specified data item. The L2 cache 230 performs its own lookup operation and may reference an L3 cache or main memory 240 if the cache line is found not to be stored in the L2 cache 230. Either way, the L1 cache 220 is provided with the cache line containing the requested data item. The cache line is populated in the L1 cache 220 at step 3 which may trigger a victim selection event to select a victim cache line already in the L1 cache 220 to be discarded in order to make space for the new cache line to be populated. The victim cache line is selected in accordance with the eviction policy. Access to the data item is then provided to the processing circuitry at step 4.

It will be noted that the processing circuitry 110 may request access to a data item (or a number of data items less than the total number of data items stored in a cache line) whereas the caches are arranged to be populated with an entire cache line comprising a plurality of data items at a time in response to such a request. In this example, each data item is four bytes and each cache line is 64 bytes, meaning that each cache line comprises 16 data items. It will be appreciated that other example implementations may make use of different sizes of data item and cache line.

At step 5, the processing circuitry issues a series of requests to access data items belonging to the same cache line as the cache line of the data item previously requested. Since the L1 cache 220 has now been populated with that cache line at step 3, each of these accesses will lead to a hit in the L1 cache 220. These accesses can therefore be handled without the L1 cache 220 needing to reference the L2 cache 230.

Notably, this means that the L1 cache 220 'sees' the successive accesses to data items of the cache line as repeated accesses to the cache line. Given that many eviction policies either directly or indirectly use the frequency of access to an entry to determine whether that entry should be evicted in response to a victim selection event, these repeated accesses could cause the eviction control circuitry to update the eviction control information to indicate that this cache line is frequently accessed and so should not be evicted from the L1 cache 220. However, it may be fairly common that program code seeks to access data items corresponding to a range of memory addresses once and then not access those data items again (at least for a relatively long period of time). For example, the processing circuitry may wish to read the data within the cache line or write updated values to the cache line. However, it may not be possible to do this via a single access, for example due to bandwidth constraints. In such a scenario, it will be apparent that what is logically one access actually is implemented by a series of sequential accesses to the same cache line. In this case, by virtue of the series of accesses to the data items of the cache line, the cache line could become over-promoted, causing other cache lines more likely to be used again soon to be evicted in preference to this cache line.

As can be seen graphically from the relatively large number of arrows between the processing circuitry 110 and the L1 cache 220 in comparison with the arrows depicted between L1 cache 220 and L2 cache 230, the above described problem is particularly prevalent in the L1 cache 220. This occurs because the L1 cache 220 is arranged to store the entire cache line containing the requested data item in response to the first access request from the processing circuitry 110, which means that when the subsequent accesses to other data items in the cache line are received, these accesses will lead to a hit in the L1 cache 220 and so the L2 cache 230 does not need to be referenced. In this way therefore, the L1 cache 220 acts to filter the accesses that are seen by the caches at lower levels of the cache hierarchy.

Figure 3A:
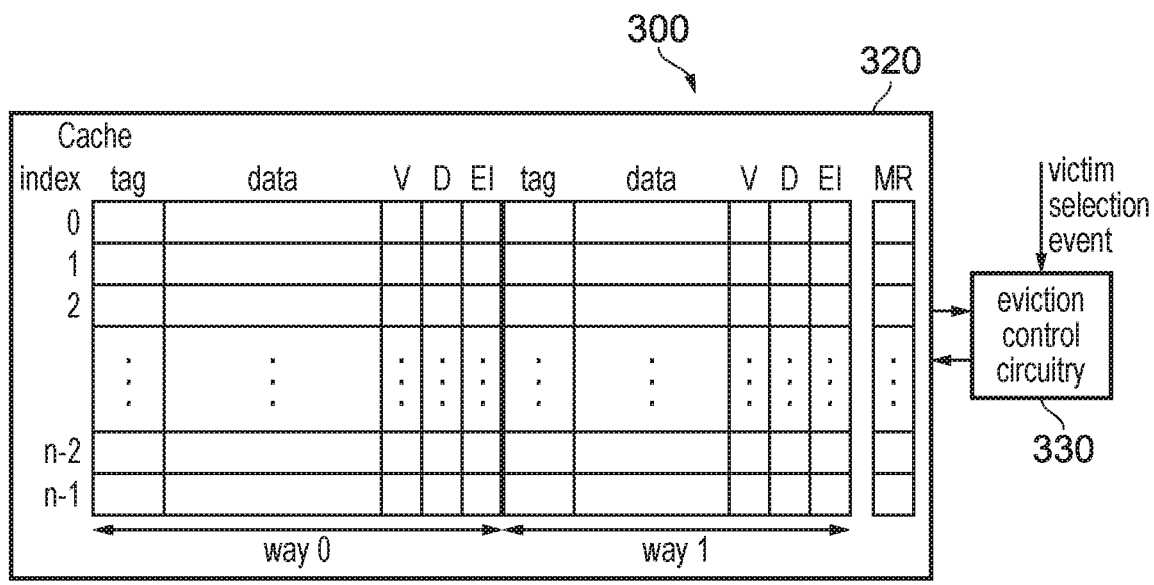
FIGS. 3A and 3B illustrate the structure of a cache in accordance with one example implementation.
Figure 3B:
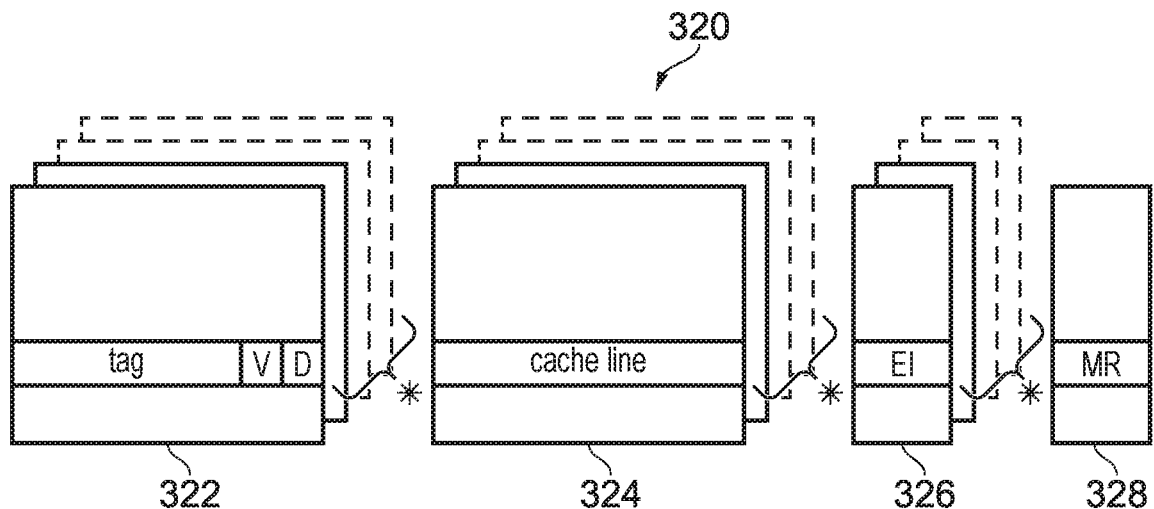

FIGS. 3A and 3B illustrate the structure of a cache in accordance with one example arrangement. As can be seen from FIG. 3A, a cache 320 (which may be an L1 cache, L2 cache, or other level of cache) stores data in a two-way set associative structure (this is merely an example and it will be appreciated that caches with higher associativity could be used). The cache 320 comprises n sets labelled 0 to n−1, each set comprising two ways, way 0 and way 1. When data is stored in the data portion of a cache line, at least a portion of the address of that data is used to identify the index of the set in the cache in which the data is to be stored. Within this set however, the data may be stored in a cache line of either of the two ways. A tag (formed by another portion of the address) is stored in association with the cache line selected to indicate the address of the data stored therein. Therefore, in response to a request to access data stored in the cache, a portion of the address of the requested data can be used to identify the set in which the cache line containing the data item would be stored if that data is present in the cache and another portion of the address is compared against the tags stored in the cache lines of that set to determine whether the desired data is stored in any of the cache lines (there being one cache line per way) of that set.

In addition to the tag and the data itself, the cache line may also store other information such as valid and dirty flags to indicate whether the contents of the corresponding cache line are valid and whether data stored in the cache line is dirty, i.e., whether it is more up-to-date than the version held in memory.

The cache may also store eviction control information such as an eviction influencing (EI) value for each cache line as depicted in FIGS. 3A and 3B. The eviction influencing values are maintained by eviction control circuitry 330 and used by the eviction control circuitry 330 to determine, in response to a victim selection event, an entry of the cache to be selected for eviction. In the example of FIGS. 3A and 3B, the eviction influencing value is a prediction value maintained in accordance with a RRIP policy which specifies how the prediction value is to be updated in response to accesses. Specifically, the RRIP policy specifies that on allocation to the cache, the prediction value for the newly allocated cache line is set to an initial value (such as two) and the prediction values for the cache lines stored in the other ways of the same set are incremented by one. In response to accesses to a cache line that do not involve allocation, the prediction value for that cache line is set to zero. In response to a victim selection event, for example, when a new cache line needs to be allocated into the set and both ways of the set are already full, the cache line with the highest prediction value is selected for eviction and marked as invalid.

However, as explained above with reference to FIG. 2, successive accesses to a cache line that should logically be regarded as a single access can lead to over-promotion of a cache line, such as where sequential data items of a cache line are accessed in turn. Specifically, with the RRIP policy employed in the example of FIGS. 3A and 3B, repeated accesses to a cache line will mean ensure that the prediction value of the cache line will be set to zero and so that cache line is the least likely to be evicted. This behaviour may however be undesirable since the pattern of accesses whereby a cache line is allocated and then the data items of the cache line accessed in turn may not be indicative of a cache line that is likely to be accessed again in the same way that an otherwise frequently accessed cache line might be.

Therefore, in accordance the techniques described herein, the eviction control circuitry 330 is configured to maintain an indication of a most-recent entry identifying the cache line most recently subjected to at least a given type of access. In the example of FIGS. 3A and 3B, a most-recent cache line indication is maintained for each set of the cache 320, indicating the way (and hence cache line) of the cache 320 into which content was most-recently allocated. The eviction control circuitry 330 is configured to update the most-recent cache line indication to indicate the way into which content is allocated in response to that content being allocated into a selected cache line. The indication of a most-recent cache line could be implemented in a number of ways, however, in the example of FIGS. 3A and 3B, the indication comprises a single bit which takes a first value (e.g., zero) when content was most-recently allocated into way 0 of the set, and a second value (e.g., one) when content was most-recently allocated into way 1 of the set. It will be appreciated that storage structures with a different associativity may implement the indication of a most-recent entry in a different manner. For example, two bits may be used to provide the indication of a most-recent cache line in a 4-way set associative cache.

The eviction control circuitry 330 is configured to reference the indication of the most-recent cache line in response to an access to a cache line to determine whether the eviction control information should be updated. Specifically, the eviction control circuitry 330 is configured to prevent an update to the eviction control information in response to an access to the most-recent cache line. If the cache line is the cache line in the set most-recently subjected to at least the given type of access, the eviction control circuitry 330 is configured to ignore the access for the purposes of maintaining the eviction control information. In the example depicted in FIGS. 3A and 3B, this means that when an access is made to the cache line that was most-recently allocated in the set, the eviction control circuitry 330 can identify that this is the case using the indication of a most-recent cache line and avoid updating the eviction influencing value for the cache line.

Therefore, when content is allocated in a cache line of the cache, the eviction influencing value for that cache line is set to the initial value (e.g., 2), the most-recent indication is set to identify the way (and hence cache line) of the set into which the content was allocated, and the eviction influencing value for the other cache line in the same set is incremented by one. If subsequent accesses are made to the same cache line, for example access to different data items of the same cache line, the eviction control circuitry 330, based on the indication of the most-recent cache line, prevents the eviction influencing value being set to 0. When a victim selection event later occurs to select a victim cache line from that set, the eviction control circuitry 330 is more likely to select the most-recent cache line for eviction since the cache line has not been over-promoted by virtue of the repeated accesses to the cache line. This enables the eviction policy to operate more effectively, increasing the likelihood that a requested data item will be present in the cache 320 and reducing the incidence of cache misses which could lead to time-consuming references to lower levels of cache.

FIG. 3A depicts a logical arrangement for a cache 320 with the data shown as being stored in a table. It will be appreciated that this may not resemble the physical structure of the cache. Instead, the cache 320 may comprise several different structures as illustrated in FIG. 3B.

FIG. 3B depicts data RAMs 324 used to store data within a plurality of cache lines, with each cache line sized so as to enable a plurality of data items to be stored therein. For each cache line in the data RAMs 324, there is a corresponding entry in the tag RAMs 322 (which can logically be considered as forming part of the cache line). Each entry is used to store a portion of a memory address that is common to the data items held in the corresponding cache line, this memory address portion also being referred to as a tag value. The valid flag and dirty flag may also be stored in the tag RAMs 322. There is also provided separate eviction control storage 326 storing eviction influencing values corresponding to the entries in the tag and data RAMs 322, 324. Each of the tag RAM 322, data RAM 324, and eviction control storage 326 comprise entries for a plurality of ways. In the example of FIG. 3B, there are shown in solid lines the two ways of the cache of FIG. 3A. However, it will be appreciated that further storage could be provided for additional ways as illustrated with dotted lines.

As illustrated with an asterisk (*) in FIG. 3B, the corresponding entries across the ways of the tag RAM 322, data RAM 324, and eviction control storage 326 form a set that can be identified using a portion of a memory address. Most-recent entry storage 328 is also provided comprising an indication of a most-recently accessed cache line for each set. In this example, each entry of the most-recent entry storage 328 relates to a set and comprises a bit indicative of which way in the data RAM contains the most-recently allocated cache line.

Figure 4:
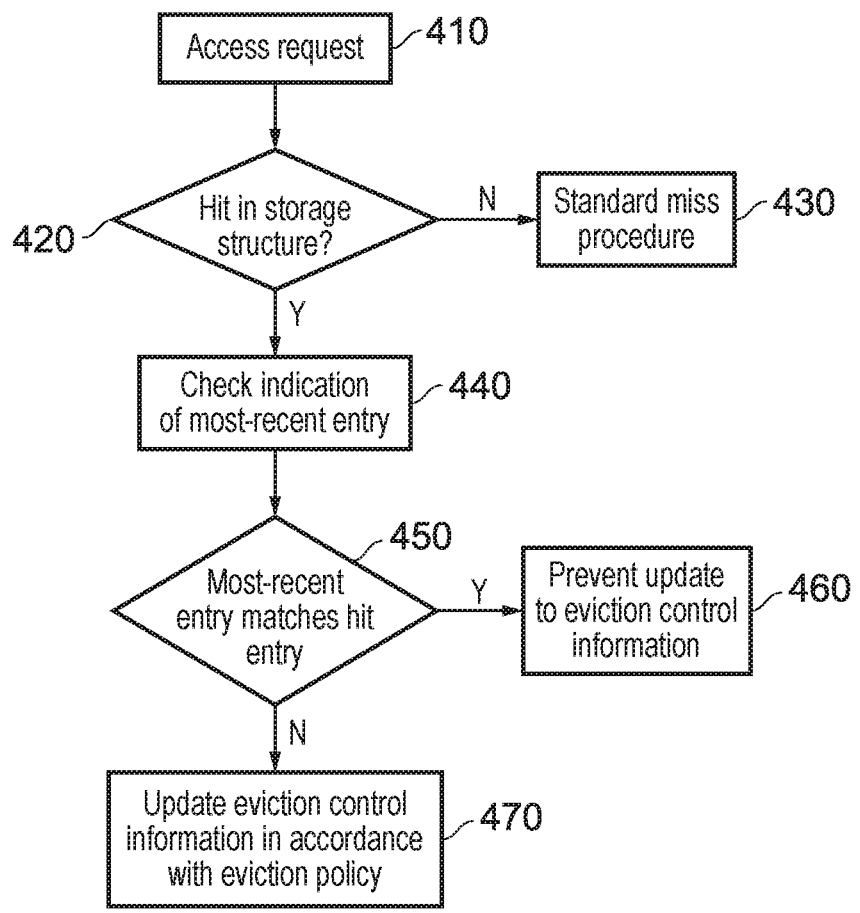
FIG. 4 is a flow diagram illustrating steps performed by eviction control circuitry in response to an access request.

FIG. 4 is a flow diagram illustrating the steps performed by the eviction control circuitry for a storage structure in response to an access request. The access request is received by the storage structure at step 410. This access request may come from processing circuitry either directly or via one or more other caches in a cache hierarchy, from prefetch circuitry speculatively fetching instructions into a cache, or may originate from another source such as branch prediction circuitry referencing a branch prediction storage structure as part of a branch prediction process.

At step 420, it is determined whether the access request identifies data that is already stored in the storage structure. If the requested data is not already stored in the storage structure then a miss occurs in the storage structure. Conversely, if the requested data is stored in the storage structure, a hit occurs.

In response to a miss, a standard miss procedure is carried out as indicated by step 430. The specific operations performed as a part of the miss procedure will depend on the specific implementation, however, the miss procedure may involve requesting the data from another level of a storage structure hierarchy or responding to the access request with an indication that the data is not stored in the storage structure.

In response to a hit at step 420, the flow proceeds to step 440 whereupon the indication of the most-recent entry maintained by the eviction control circuitry is checked. The entry identified as the most-recent entry is compared against the entry for which a hit was detected at step 450.

If the entry for which access is requested is not the most-recent entry, the eviction control circuitry is configured to update the eviction control information at step 470 in accordance with the eviction policy. This may include setting an eviction influencing value or prediction value for the entry to zero, or updating the eviction control information in some other manner. For example, the eviction control information may comprise a tree structure with each node of the tree corresponding to a portion of the storage structure, and updating the eviction control information may comprise changing the value stored at one or more nodes of the tree structure.

If, however, the entry for which access is requested is the most-recent entry, the eviction control circuitry is configured to prevent an update to at least the eviction control information associated with the most-recent entry at step 460. As discussed earlier, this can improve the performance of the eviction policy and ultimately increase the likelihood that a requested data item will be present in the storage structure.

Figure 5:
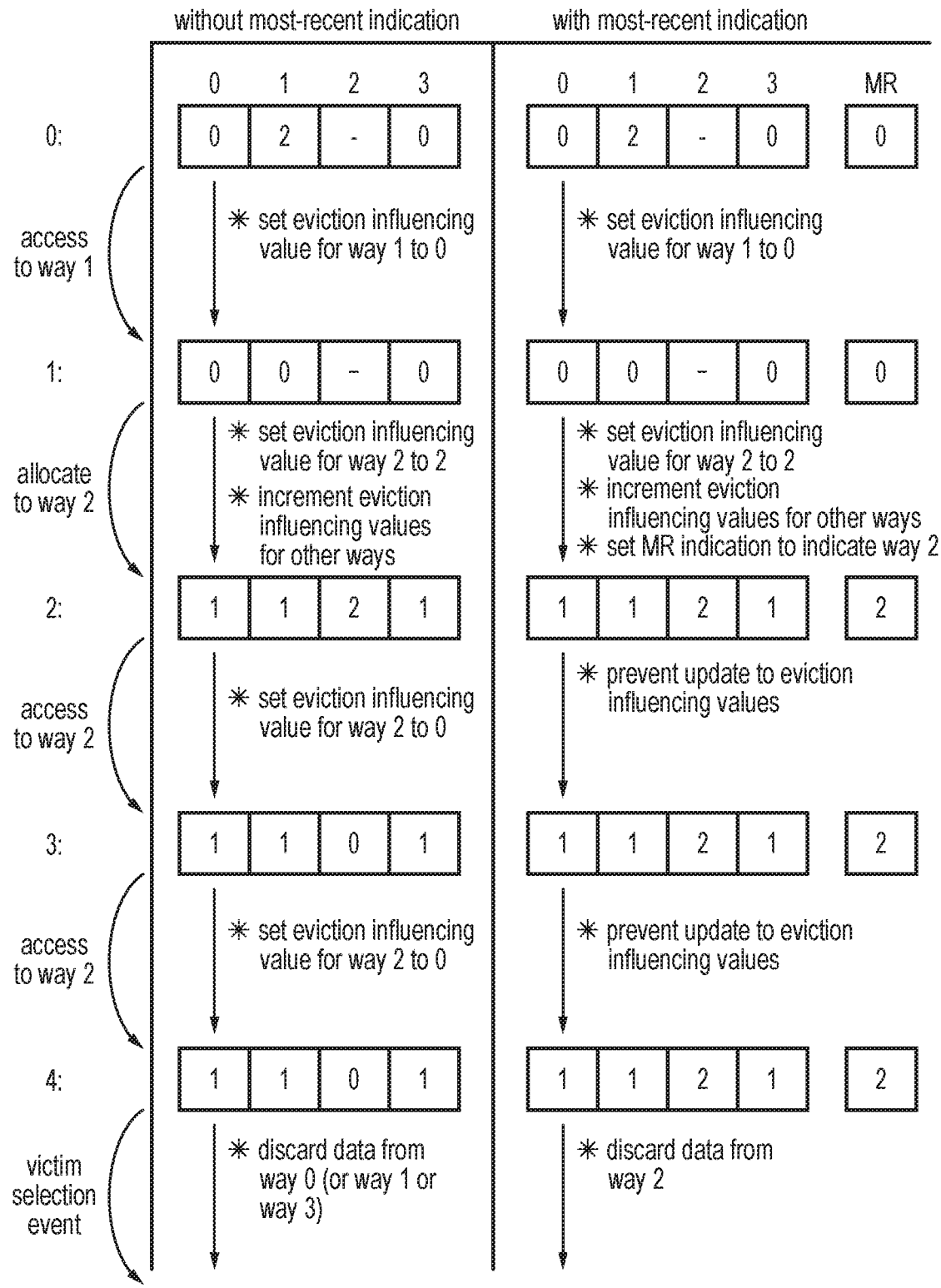
FIG. 5 is a worked example illustrating the operation of the eviction control circuitry in accordance with an example implementation and an implementation not making use of a most-recent indication.

FIG. 5 is a worked example illustrating the operation of the eviction control circuitry in accordance with an example implementation and another implementation not making use of a most-recent indication. FIG. 5 depicts in the left column, the state of eviction control information updated in response to the accesses indicated at the left-hand-side of FIG. 5. The eviction control information in the left column is updated in accordance with an RRIP policy but without referencing an indication of a most-recent entry. In the right column of FIG. 5, the state of eviction control information and a most-recent entry indication as updated in response to the accesses shown at the left-hand-side of FIG. 5 is depicted in accordance with an example implementation. In the examples of FIG. 5, the storage structure associated with the depicted eviction control information is a 4-way set associative storage structure and the eviction control information comprises an eviction influencing value for each way of a particular set of the set associative storage structure.

The RRIP policy defines how the eviction influencing values are to be updated and how a victim entry is selected in response to a victim selection event. As illustrated in this worked example, when an entry is allocated into the set, the eviction influencing value for the way into which it was allocated is set to two as an initial value, and the eviction influencing value for the other ways are incremented by one. In response to any other type of access, the eviction influencing value for the way being accessed is set to zero. In response to a victim selection event, the way (or one of the ways) with the highest eviction influencing value is selected for eviction. In the example implementation depicted in the right-hand side of FIG. 5, the most-recent indication is maintained to identify the way into which data was most-recently allocated. The operation of this policy will now be explained with reference to the worked example of FIG. 5.

Stage 0 provides an initial state for the eviction influencing values. Ways 0 and 3 both have a eviction influencing value of 0, way 1 has a eviction influencing value of 2, and no valid eviction influencing value is stored for way 2 as this way of the storage structure does not store valid data. In the right column, it will be seen that the most-recent indication is set to 0 to indicate that the way into which an entry was most-recently allocated was way 0.

Following stage 0, an access is made to way 1. In accordance with the eviction policy in the examples of both the left and right column of FIG. 5, the eviction influencing value for way 1 is set to 0 as can be seen at stage 1.

Following stage 1, a new entry is allocated into the set at way 2. Consequently, for the examples of both left and right columns, the eviction influencing value for way 2 is set to an initial value of 2 and the eviction influencing values for the other ways are incremented by 1. Additionally, where the most-recent indication is provided in accordance with the techniques described herein, the most-recent indication is updated to indicate that way 2 is the way into which data was most recently allocated as can be seen at stage 2 in the right column.

Following stage 2, an access is made to way 2. In the example of the left column which does not make use of a most-recent indication, the eviction influencing value for way 2 is set to 0. However, in the example of the right column, the eviction control circuitry references the most-recent indication and determines that the access is being made to the most-recent entry (way 2). Therefore, the eviction control circuitry suppresses the update to the eviction influencing value to avoid over-promoting the entry. Hence, it can be seen at stage 3 that the eviction influencing values in the right column are unchanged from stage 2 whereas in the left column, the eviction influencing value for way 2 has been set to 0.

Following stage 3, another access is made to way 2. Again, the eviction influencing value in the left column is set to 0 and the eviction control circuitry prevents an update to the eviction influencing value of the most-recent entry in the right column.

Following stage 4, a victim selection event is triggered. The eviction control circuitry therefore selects a victim entry whose data is to be discarded. This discarding may involve deleting the data in the victim entry, overwriting the data in the entry with new data, and/or marking the entry as invalid. In this example, the eviction policy specifies that the entry with the highest eviction influencing eviction influencing value is to be discarded. In the example of the left column, the entry for way 2 has been set to 0 by virtue of the accesses following its allocation and so ways 0, 1, and 3 all have higher eviction influencing values. Where there is more than one entry with a shared highest eviction influencing value, any suitable method for selecting one of these entries as a victim entry may be used. In this example, way 0 is selected as the first entry although the victim entry could for example be selected at random from the entries with the highest eviction influencing values.

However, in the right column, the update to the eviction influencing value for way 2 was prevented and so the entry with the highest eviction influencing value is way 2. The data in way 2 is therefore discarded.

It can be seen from the example of FIG. 5 that where data was allocated to way 2 and then accessed repeatedly, in the example which did not make use of a most-recent indication, the data in way 2 was promoted and avoided eviction. However, this may not be desirable, for example, if it is determined that a series of accesses in this way is not indicative of data that is likely to be referenced again soon. For example, where entries are likely to be allocated, accessed one or more times and then not accessed again for a long time, the standard eviction policy may perform poorly at ensuring the most relevant data is maintained in the storage structure. However, in the example of the right column, by making use of the most-recent indication and preventing an update to the eviction influencing value when an access was made to the most-recent entry, that entry was not promoted and so was selected for eviction. This may lead to better performance of the eviction policy and fewer misses in the storage structure.

Figure 6:
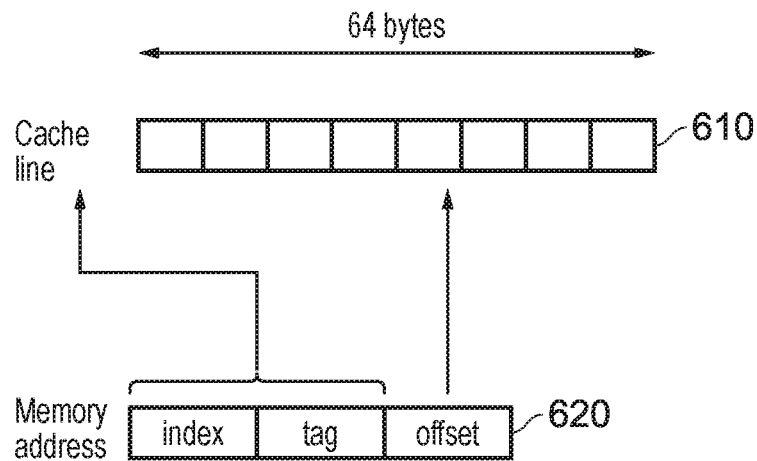
FIG. 6 is a schematic illustrating the structure of a cache line.

FIG. 6 is a schematic illustrating the structure of a cache line 610. In this example, the cache line 610 is 64 bytes long and comprises eight individually addressable data items. Each data item is therefore eight bytes long, however it will be appreciated that the number of data items, length of each data item, and the length of the cache line may be different in different implementations. Where the storage structure is a cache, the storage structure may be arranged to store in each entry an entire cache line and provide access to the data items of the cache to the processing circuitry.

FIG. 6 also depicts a memory address 620 for identifying a data item. The memory address 620 comprises a first portion which is used to identify the cache line to which the data item belongs. In this example, the first portion of the memory address is split into an index portion which is used to identify a set within a cache in which the data may be stored and the tag portion of the address which is compared against tags stored in association with each of the cache lines in the cache. If the tag of the memory address matches the tag stored in one of the cache lines for the set identified by the index portion of the address, the requested data has been found, i.e. a hit has occurred within the cache. The second portion of the memory address comprises an offset portion which identifies the data item within the cache line. As explained in more detail above, where an entry of a storage structure comprises a plurality of individually addressable data items such as the individual data items of a cache line, it may be relatively common that the data items of the entry are accessed sequentially which may appear as repeated accesses to the entry.

Figure 7:
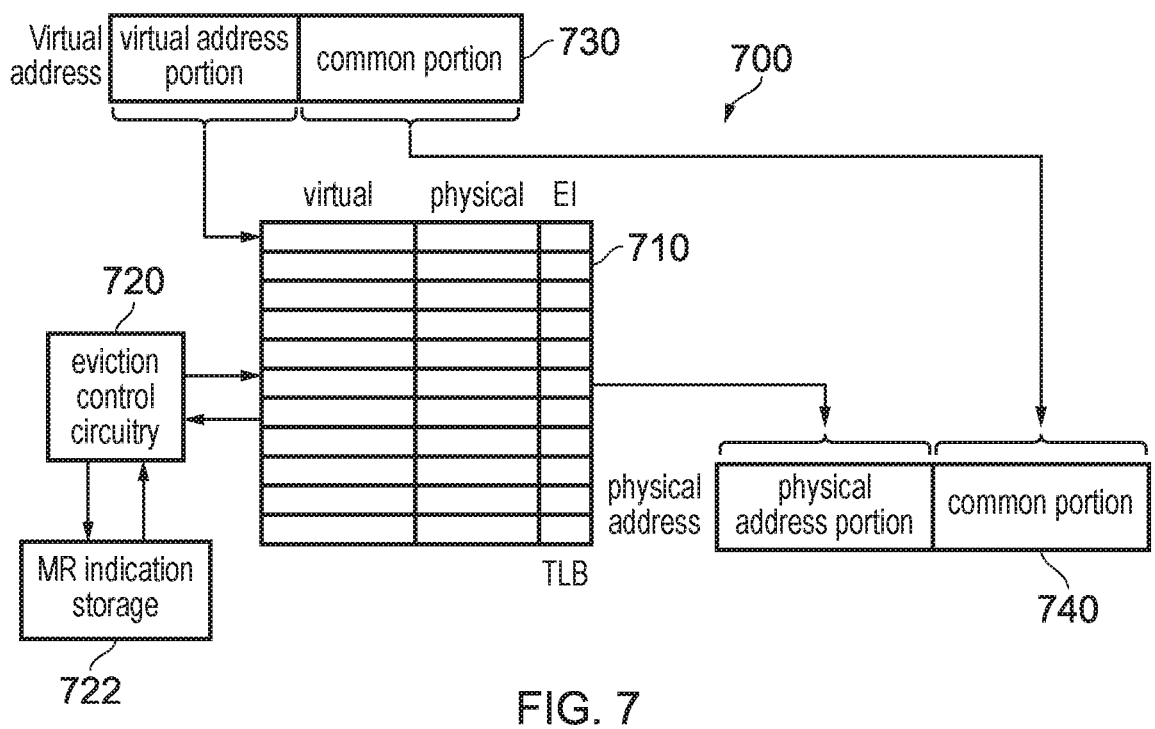
FIG. 7 is a schematic illustrating a translation lookaside buffer (TLB) in accordance with an example implementation.

FIG. 7 is a schematic illustrating an apparatus 700 comprising a TLB 710 in accordance with an example implementation. The TLB 710 is an example of a storage structure that may be used with the techniques described herein. The TLB 710 stores address translation information for converting between a virtual address 730 and a physical address 740. In the example of FIG. 7, the virtual address 730 and physical address 740 both comprise a common portion that does not need to be translated. The virtual address 730 does however comprise a virtual address portion which must be translated to a physical address portion of the physical address 740 in order to convert between the virtual address and the physical address. An MMU may reference the TLB 710 storing pairs of virtual and physical portions as entries in order to perform this translation.

In order to control which virtual-physical pairs are stored in the TLB 710, eviction control circuitry 720 is provided and the TLB 710 stores an eviction influencing value for each entry in the TLB 710. This eviction influencing value is maintained by the eviction control circuitry 720. Most-recent indication storage 722 is also provided to indicate a most-recent entry. In this example, the most-recent indication storage 722 stores an indication of the entry in the entire TLB 710 most-recently subjected to at least a given type of access rather than providing separate indications for each sub-structure of a plurality of sub-structures of the storage structure.

Figure 8:
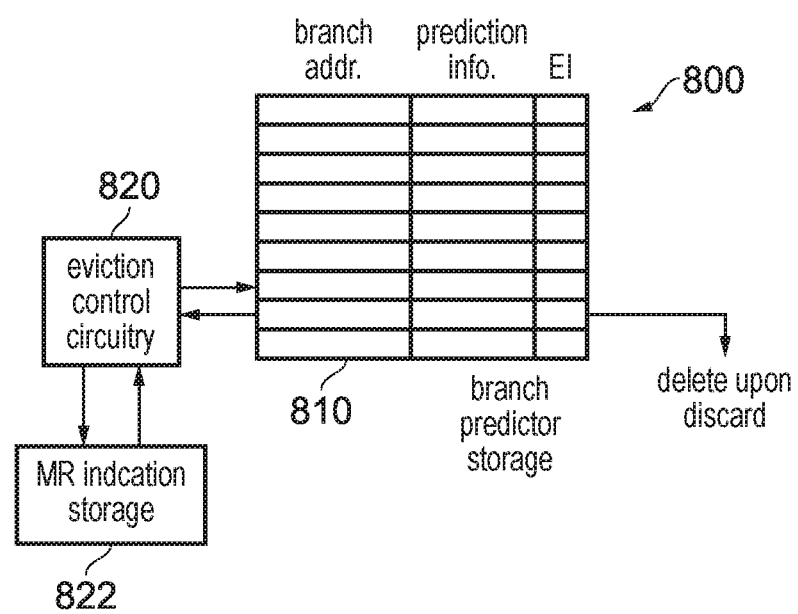
FIG. 8 is a schematic illustrating a storage structure for a branch predictor in accordance with an example implementation.

FIG. 8 is a schematic illustrating an apparatus 800 comprising a storage structure 810 for a branch predictor in accordance with an example implementation. The storage structure 810 stores prediction information associated with a plurality of different branch addresses and the techniques described herein may be applied to this storage structure 810. The branch predictor is configured to reference this storage when carrying out branch prediction. The prediction information could take a number of forms, but may for example comprise an indication as to whether a branch is predicted taken/not-taken or prediction information about the target address of a particular branch instruction. Eviction control circuitry 820 is provided to control the entries that are stored in the storage structure 810 with reference to the eviction influencing values stored in association with the entries of the storage structure 810. As depicted in FIG. 8, most-recent indication storage 822 is also provided to store an indication of an entry of the storage structure 810 most recently subjected to at least a given type of access. Although other example implementations have been described where discarding a victim entry involves evicting the data in the entry to a lower level in a hierarchy of storage structures (for example evicting translation data from the TLB 710 of FIG. 7 to a lower level TLB), in the example of FIG. 8, data to be discarded may be deleted from the storage structure 810 without being stored in any other storage structure.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a storage structure with a plurality of entries to store data; and
eviction control circuitry configured to maintain eviction control information in accordance with an eviction policy, the eviction policy specifying how the eviction control information is to be updated in response to accesses to the entries of the storage structure;
wherein:
the eviction control circuitry is responsive to a victim selection event to employ the eviction policy to select, with reference to the eviction control information, one of the entries to be a victim entry whose data is to be discarded from the storage structure;
the eviction control circuitry is further configured to maintain, for each of one or more groups of entries in the storage structure, an indication of a most-recent entry, wherein for each group the most-recent entry is an entry in that group that was most recently subjected to at least a given type of access;
for each group, in response to an access to a given entry of that group other than the most-recent entry for that group, the eviction control circuitry is configured to update the eviction control information according to the eviction policy, and in response to an access to the most-recent entry for that group, the eviction control circuitry is configured to prevent an update to at least the eviction control information associated with the most-recent entry;
the eviction control circuitry is configured to implement the eviction policy to maintain the eviction control information to distinguish between a used-many state for entries storing data subject to one or more accesses following an initial access and a used-once state for entries storing data not subject to an access following an initial access; and
the eviction control circuitry is configured to prevent an update to the eviction control information associated with the most-recent entry from the used-once state to the used-many state.

2. The apparatus according to claim 1, wherein each entry is arranged to store a plurality of data items that can be accessed independently, and by preventing the update to at least the eviction control information associated with the most-recent entry, this prevents multiple sequential accesses to the individual data items of the entry from causing the eviction control information associated with the most-recent entry to change from the used-once state to the used-many state.

3. The apparatus according to claim 1, wherein the eviction control information comprises an eviction influencing value for each entry in the storage structure, the eviction influencing value being initialised to a first value on allocation of data into that entry, and the eviction influencing value being modified from the first value on occurrence of a subsequent access to the entry after the data has been allocated unless prevented due to that entry being identified as the most-recent entry.

4. The apparatus according to claim 3, wherein:
the eviction policy is a re-reference interval prediction policy (RRIP) for which the eviction control information comprises a prediction value for each entry in the storage structure, indicative of a predicted re-reference interval for that entry; and
preventing the update comprises preventing an update of the prediction value for the most-recent entry.

5. The apparatus according to claim 1, wherein:
the given type of access is a fill access that causes an identified entry of the storage structure to be filled with data.

6. The apparatus according to claim 5, wherein:
the eviction control circuitry is configured to update, on each occurrence of the fill access to an entry of a particular group, the indication of the most-recent entry for the particular group to indicate the identified entry that was filled with data in response to the fill access.

7. The apparatus according to claim 1, wherein:
each group is associated with a sub-structure of the storage structure.

8. The apparatus according to claim 7, wherein:
the storage structure is a set associative storage structure and each sub-structure is a set of the set associative storage structure; and
the indication of a most-recent entry is maintained by the eviction control circuitry for each set of the set associative storage structure to provide an indication of a most-recent way of the set most recently subjected to at least the given type of access.

9. The apparatus according to claim 1, wherein:
the storage structure comprises a single group of all of the entries in the storage structure and the indication of a most-recent entry comprises an indication of the entry in the storage structure most recently subjected to at least the given type of access.

10. The apparatus according to claim 1, wherein:
the storage structure is a cache and each entry of the plurality of entries of the cache comprises a cache line; and
each cache line is arranged to cache a plurality of individually addressable data items.

11. The apparatus according to claim 10, wherein:
the cache is a level 1 (L1) cache responsive to accesses from processing circuitry and the access to the given entry is an access to a particular data item of a cache line specified by the processing circuitry.

12. The apparatus according to claim 1, wherein:
the storage structure is at least one of:
  a cache to store data for access by processing circuitry;
  a translation lookaside buffer (TLB) to store address translation data used to convert a virtual address specified by the processing circuitry into a physical address in memory;
  a storage used to maintain branch prediction information referred to by branch prediction circuitry; and
  a storage structure used to maintain access pattern information used to determine data to be prefetched into the cache.

13. The apparatus according to claim 1, wherein:
the storage structure is a storage structure within a hierarchy of storage structures and the storage structure is configured to obtain, in response to a request to access data absent from the storage structure, the data from an additional storage structure at a different level of the hierarchy.

14. The apparatus according to claim 1, wherein:
the most-recent entry in a particular group is an entry in the particular group that was most recently subjected to any of a plurality of supported types of access.

15. The apparatus according to claim 1, wherein:
the victim selection event is triggered to make space in the storage structure for allocating data in response to a request to access data not already stored in the storage structure.

16. The apparatus according to claim 1, wherein:
the victim selection event is triggered by a cache maintenance operation.

17. A method of managing a storage structure having a plurality of entries for storing data, the method comprising:
maintaining eviction control information in accordance with an eviction policy, the eviction policy specifying how the eviction control information is to be updated in response to accesses to the entries of the storage structure, the eviction control information distinguishing between a used-many state for entries storing data subject to one or more accesses following an initial access and a used-once state for entries storing data not subject to an access following an initial access;
employing the eviction policy to select, responsive to a victim selection event, with reference to the eviction control information, one of the entries to be a victim entry whose data is to be discarded from the storage structure;
maintaining, for each of one or more groups of entries in the storage structure, an indication of a most-recent entry, wherein for each group the most-recent entry is an entry in that group that was most recently subjected to at least a given type of access;
for each group, in response to an access to a given entry of that group other than the most-recent entry for that group, updating the eviction control information according to the eviction policy; and
for each group, in response to an access to the most-recent entry for that group, preventing an update to at least the eviction control information associated with the most-recent entry from the used-once state to the used-many state.

18. An apparatus comprising:
a storage structure with a plurality of entries to store data; and
eviction control circuitry configured to maintain eviction control information in accordance with an eviction policy, the eviction policy specifying how the eviction control information is to be updated in response to accesses to the entries of the storage structure;
wherein:
the eviction control circuitry is responsive to a victim selection event to employ the eviction policy to select, with reference to the eviction control information, one of the entries to be a victim entry whose data is to be discarded from the storage structure;
the eviction control circuitry is further configured to maintain, for each of one or more groups of entries in the storage structure, an indication of a most-recent entry, wherein for each group the most-recent entry is an entry in that group that was most recently subjected to at least a given type of access, wherein the given type of access is a fill access that causes an identified entry of the storage structure to be filled with data;
for each group, in response to an access to a given entry of that group other than the most-recent entry for that group, the eviction control circuitry is configured to update the eviction control information according to the eviction policy, and in response to an access to the most-recent entry for that group, the eviction control circuitry is configured to prevent an update to at least the eviction control information associated with the most-recent entry; and
the eviction control circuitry is configured to update, on each occurrence of the fill access to an entry of a particular group, the indication of the most-recent entry for the particular group to indicate the identified entry that was filled with data in response to the fill access.

19. An apparatus comprising:

a storage structure with a plurality of entries to store data; and eviction control circuitry configured to maintain eviction control information in accordance with an eviction policy, the eviction policy specifying how the eviction control information is to be updated in response to accesses to the entries of the storage structure;

wherein:

the eviction control circuitry is responsive to a victim selection event to employ the eviction policy to select, with reference to the eviction control information, one of the entries to be a victim entry whose data is to be discarded from the storage structure;

the eviction control circuitry is further configured to maintain, for each of one or more groups of entries in the storage structure, an indication of a most-recent entry, wherein for each group the most-recent entry is an entry in that group that was most recently subjected to at least a given type of access;

for each group, in response to an access to a given entry of that group other than the most-recent entry for that group, the eviction control circuitry is configured to update the eviction control information according to the eviction policy, and in response to an access to the most-recent entry for that group, the eviction control circuitry is configured to prevent an update to at least the eviction control information associated with the most-recent entry;

each group is associated with a sub-structure of the storage structure;

the storage structure is a set associative storage structure and each sub-structure is a set of the set associative storage structure; and the indication of a most-recent entry is maintained by the eviction control circuitry for each set of the set associative storage structure to provide an indication of a most-recent way of the set most recently subjected to at least the given type of access.

* * * * *